(12) United States Patent
Pyo (10) Patent No.: US 9,514,709 B2
(45) Date of Patent: Dec. 6, 2016

(54) METHODS OF CORRECTING GAMMA AND DISPLAY DEVICE EMPLOYING THE SAME

(71) Applicant: Samsung Display Co., Ltd., Yongin, Gyeonggi-do (KR)

(72) Inventor: Si-Beak Pyo, Cheonan-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 27 days.

(21) Appl. No.: 14/573,706

(22) Filed: Dec. 17, 2014

(65) Prior Publication Data

US 2015/0348505 A1 Dec. 3, 2015

(30) Foreign Application Priority Data

May 30, 2014 (KR) .................. 10-2014-0066352

(51) Int. Cl.
| | |
|---|---|
| *G06K 9/46* | (2006.01) |
| *G09G 5/02* | (2006.01) |
| *G09G 3/20* | (2006.01) |
| *G09G 5/06* | (2006.01) |
| *G09G 5/10* | (2006.01) |
| *H04N 1/60* | (2006.01) |
| *H04N 9/73* | (2006.01) |
| *G06T 7/40* | (2006.01) |

(52) U.S. Cl.
CPC .............. *G09G 5/10* (2013.01); *G06K 9/4652* (2013.01); *G06K 9/4661* (2013.01); *G06T 7/408* (2013.01); *G09G 3/2003* (2013.01); *G09G 5/02* (2013.01); *G09G 5/026* (2013.01); *G09G 2320/0276* (2013.01); *G09G 2320/046* (2013.01); *G09G 2320/0673* (2013.01); *G09G 2340/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,315,378 A | * | 5/1994 | Satou ................. | H04N 9/31 |
| | | | | 348/181 |
| 2007/0052735 A1 | * | 3/2007 | Chou ................. | H04N 17/04 |
| | | | | 345/690 |

(Continued)

FOREIGN PATENT DOCUMENTS

| | | |
|---|---|---|
| JP | 2004-325565 (A) | 11/2004 |
| KR | 10-2006-0098964 (A) | 9/2006 |

(Continued)

*Primary Examiner* — Wesner Sajous
(74) *Attorney, Agent, or Firm* — Knobbe, Martens, Olson & Bear, LLP (57) ABSTRACT

Methods of correcting gamma and a display device employing the same are disclosed. In one aspect, the method includes periodically measuring, at a plurality of predetermined times, a single color measurement luminance related to a single color component that is displayed on the display panel. The method further includes calculating a luminance difference between the single color measurement luminance and a single color target luminance. The single color target luminance is a target luminance of the single color component at each of the predetermined times. The method also includes changing a gamma setting for a plurality of data signals provided to the display panel based on the luminance difference.

20 Claims, 7 Drawing Sheets

(56) References Cited

U.S. PATENT DOCUMENTS

| | | | |
|---|---|---|---|
| 2010/0194925 A1* | 8/2010 | Kubota | H04N 5/23212 348/234 |
| 2011/0109661 A1* | 5/2011 | Lee | G09G 3/20 345/690 |
| 2012/0242710 A1* | 9/2012 | Kang | G09G 3/3208 345/690 |
| 2013/0135272 A1* | 5/2013 | Park | G09G 3/3233 345/211 |
| 2013/0271515 A1 | 10/2013 | Lee | |

FOREIGN PATENT DOCUMENTS

| | | |
|---|---|---|
| KR | 10-2013-0086877 (A) | 8/2013 |
| KR | 10-2013-0117105 (A) | 10/2013 |
| KR | 10-2015-0010807 (A) | 1/2015 |
| KR | 10-2015-0040095 (A) | 4/2015 |

\* cited by examiner

METHODS OF CORRECTING GAMMA AND DISPLAY DEVICE EMPLOYING THE SAME

INCORPORATION BY REFERENCE TO ANY PRIORITY APPLICATIONS

This application claims priority under 35 USC §119 to Korean Patent Applications No. 10-2014-0066352, filed on May 30, 2014 in the Korean Intellectual Property Office (KIPO), the contents of which are incorporated by reference herein in its entirety.

BACKGROUND

Field

The described technology generally relates to methods of correcting gamma and a display device employing the same.

Description of the Related Technology

A gamma setting is defined as the correlation between displayed luminance and gray-level data. According to Webber's law, human eyes are more sensitive in dark environments than in bright environments. Thus, the correlation between the displayed luminance and the gray-level data (i.e., the gamma setting) may be set to a non-linear relationship based on our physiological characteristics. Further, a gamma correction used for changing a predetermined gamma setting can be performed to allow a perceived change in the displayed luminance to be smooth for a given a change in the gray-level data.

SUMMARY OF CERTAIN INVENTIVE ASPECTS

One inventive aspect is a method of correcting gamma to minimize or reduce adverse effects due to the deterioration of pixels.

Another aspect is a display device employing the method of correcting gamma.

Another aspect is a method of correcting gamma including an operation of periodically measuring, at each of a plurality of predetermined times, single color measurement luminance related to a single color component that is displayed on a display panel, an operation of calculating luminance difference between the single color measurement luminance and single color target luminance, the single color target luminance being target luminance of the single color component at each of the predetermined times, and an operation of changing a gamma setting for a data signal provided to the display panel based on the luminance difference.

In example embodiments, an average voltage level of the data signal related to a single color component that is deteriorated to a relatively greater extent may be greater than an average voltage level of the data signal related to a single color component that is deteriorated to a relatively lesser extent when the gamma setting is changed.

In example embodiments, the method may further include an operation of changing the gamma setting based on a luminance characteristic of the display panel.

In example embodiments, the single color measurement luminance may be calculated based on luminance of a measured white color and color coordinates of the measured white color, the measured white color being periodically measured at each of the predetermined times.

In example embodiments, luminance of a target white color and color coordinates of the target white color can be determined, the target white color being a target of correction at the each predetermined time. In addition, the luminance difference can be calculated based on the single color target luminance that is calculated based on the luminance of the target white color and the color coordinates of the target white color.

In example embodiments, the color coordinates of the target white color can be determined as color coordinates that is required for the display panel to display a white color at the each predetermined time.

In example embodiments, the color coordinates of the target white color can be determined by a user at the each predetermined time.

In example embodiments, the luminance of the target white color can be determined to be substantially the same as the luminance of the measured white color.

In example embodiments, the gamma setting may be changed based on an offset value read from a look up table (LUT), the offset value being read from the look up table based on the luminance difference.

In example embodiments, the offset value can be read from the look up table based on single color luminance ratio, the single color luminance ratio being a ratio of the luminance difference to the single color measurement luminance.

In example embodiments, the single color measurement luminance can be measured by a simulation experiment.

In example embodiments, the offset value can be stored in a memory, the offset value being read from the look up table based on the luminance difference. In addition, the gamma setting can be changed based on the offset value.

Another aspect is a display device including a display panel including a plurality of pixels, a data driver configured to provide a data signal to the pixels, and a timing controller configured to control the data driver, and configured to calculate luminance difference between single color measurement luminance related to a single color component displayed on the display panel and single color target luminance and to change a gamma setting for the data signal based on the luminance difference. Here, the single color measurement luminance may be periodically measured at each of a plurality of predetermined times, and the single color target luminance may be target luminance of the single color component at the each predetermined time.

In example embodiments, an average voltage level of the data signal related to a single color component that is deteriorated to a relatively greater extent may be greater than an average voltage level of the data signal related to a single color component that is deteriorated to a relatively lesser extent when the gamma setting is changed.

In example embodiments, the timing controller can further change the gamma setting based on a luminance characteristic of the display panel.

In example embodiments, the single color measurement luminance can be measured by a simulation experiment.

In example embodiments, the display device can further include a memory configured to store an offset value that is read from a look up table based on the luminance difference. In addition, the timing controller can change the gamma setting based on the offset value.

In example embodiments, the display device can further include a measurement unit configured to periodically measure luminance of a measured white color displayed on the display panel and color coordinates of the measured white color at the each predetermined time.

In example embodiments, the timing controller can include a calculator configured to calculate the single color measurement luminance based on the luminance of the measured white color and the color coordinates of the measured white color.

In example embodiments, the calculator can calculate the luminance difference by calculating the single color target luminance based on luminance of a target white color and color coordinates of the target white color, the target white color being a target of correction at the each predetermined time.

Another aspect is a method of correcting gamma of a display panel, comprising periodically measuring, at a plurality of predetermined times, a single color measurement luminance related to a single color component that is displayed on the display panel; calculating a luminance difference between the single color measurement luminance and a single color target luminance, wherein the single color target luminance is a target luminance of the single color component at each of the predetermined times; and changing a gamma setting for a plurality of data signals provided to the display panel based on the luminance difference.

In example embodiments, the display panel can be configured to display a plurality of single color components, a first color component of the single color components can be deteriorated to a greater extent than the remaining single color components and an average voltage level of the data signal related to the first single color component can be greater than average voltage levels of the data signals respectively related to the remaining single color components when the gamma setting is changed. The method can further comprise changing the gamma setting based on a luminance characteristic of the display panel. The periodically measuring can comprise measuring luminance and color coordinates of a white color displayed on the display panel and calculating the single color measurement based on the luminance and color coordinates of the measured white color. The periodically measuring can further comprise determining luminance and color coordinates of a target white color, wherein the target white color is a correction target at each of the predetermined times and wherein calculating the luminance difference comprises calculating the single color target luminance based on the luminance and color coordinates of the target white color. The color coordinates of the target white color can be color coordinates that are required for the display panel to display a white color at each of the predetermined times. The color coordinates of the target white color can be determined by a user at each of the predetermined times. The determining of the luminance of the target white color can comprise setting the luminance of the target white color to be substantially the same as the luminance of the measured white color.

In example embodiments, the method can further comprise receiving an offset value from a look up table based on the luminance difference, wherein the gamma setting is changed based on the offset value. The receiving the offset value can be based on a single color luminance ratio and the single color luminance ratio can be a ratio of the luminance difference to the single color measurement luminance. The single color measurement luminance can be measured by a simulation experiment. The method can further comprise receiving an offset value from a memory based on the luminance difference and wherein the gamma setting is changed based on the offset value.

Another aspect is a display device comprising a display panel including a plurality of pixels and configured to display a single color component; a data driver configured to provide a plurality of data signals to the pixels; and a timing controller configured to: i) control the data driver, ii) calculate a luminance difference between the single color measurement luminance related to the single color component and a single color target luminance and iii) change a gamma setting for the data signals based on the luminance difference, wherein the timing controller is configured to store the single color measurement luminance, periodically measured at each of a plurality of predetermined times, and wherein the single color target luminance is a target luminance of the single color component at each of the predetermined times.

In example embodiments, the display panel can be further configured to display a plurality of single color components, a first color component of the single color components can be deteriorated to a greater extent than the remaining single color components and an average voltage level of the data signal related to the first single color component can be greater than average voltage levels of the data signals respectively related to the remaining single color components when the gamma setting is changed. The timing controller can be further configured to change the gamma setting based on a luminance characteristic of the display panel. The single color measurement luminance can be measured by a simulation experiment. The display device can further comprise a memory configured to store an offset value that is read from a look up table based on the luminance difference, wherein the timing controller is further configured to change the gamma setting based on the offset value. The display device can further comprise a measurement unit configured to periodically measure luminance and color coordinates of a white color displayed on the display panel at each of the predetermined times. The timing controller can include a calculator configured to calculate the single color measurement luminance based on the luminance and color coordinates of the measured white color. The calculator can be further configured to calculate the single color target luminance based on luminance and color coordinates of a target white color, wherein the target white color is a target of correction at each of the predetermined times.

Therefore, a method of correcting gamma according to example embodiments can change a gamma setting such that an average voltage level of a data signal related to a single color component that is deteriorated to a relatively greater extent is greater than an average voltage level of a data signal related to a single color component that is deteriorated to a relatively lesser extent. As a result, an adverse effect due to a deterioration of pixels can be minimized or reduced.

Further, a display device according to example embodiments may display a high-quality image regardless of the deterioration of pixels.

DETAILED DESCRIPTION OF CERTAIN INVENTIVE EMBODIMENTS

Display elements (e.g., organic light-emitting diodes (OLEDs)) deteriorate when used over lengthy periods. For example, in an OLED display, the required current for displaying a blue color in an OLED is greater than the required current for displaying other colors (e.g., green, red, etc). Thus, when the display is used for a long time, the luminance of blue light emitted from a blue OLED may be lower than that emitted from other colored OLEDs since the blue OLEDs will often deteriorate faster. As a result, the luminance of an OLED display which has been used for a long duration is reduced when compared to its initial luminance. In addition, the color displayed may have a yellowish hue.

Various example embodiments will be described more fully hereinafter with reference to the accompanying drawings, in which some example embodiments are shown. The described technology may, however, be embodied in many different forms and should not be construed as limited to the example embodiments set forth herein. Rather, these example embodiments are provided so that this disclosure will be through and complete, and will fully convey the scope of the described technology to those skilled in the art. In the drawings, the sizes and relative sizes of layers and regions may be exaggerated for the sake of clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the described technology. As used herein, the term "and/or" includes any and all combinations of one or more of the associated listed items.

It will be understood that when an element is referred to as being "connected" or "coupled" to another element, it can be directly connected or coupled to the other element or intervening elements may also be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the described technology. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the described technology belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
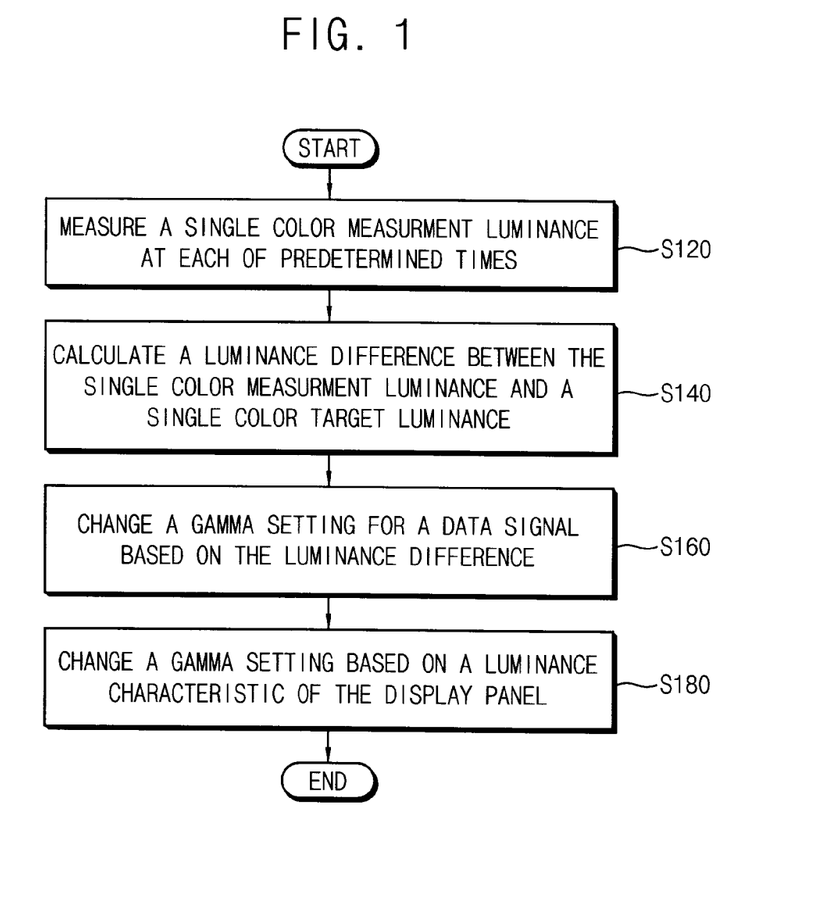
FIG. 1 is a flow chart illustrating a method of correcting gamma according to example embodiments.

FIG. 1 is a flow chart illustrating a method of correcting gamma according to example embodiments.

Referring to FIG. 1, the method of FIG. 1 periodically measures a single color measurement luminance related to a single color component that is displayed on a display panel at each of a plurality of predetermined times (S120). The method then calculates a luminance difference between the single color measurement luminance and a single color target luminance defined as the target luminance of the single color component at each of the predetermined times (S140). Next, the method changes a gamma setting for a data signal provided to the display panel based on the luminance difference (S160). In example embodiments, the method of FIG. 1 changes the gamma setting based on a luminance characteristic of the display panel (S180).

In some embodiments, when the method of FIG. 1 measures the single color measurement luminance defined as the luminance of each single color component displayed on the display panel (S120), the times for measuring a deterioration quantity of the display panel is determined according to certain criteria. In these embodiments the method of FIG. 1 periodically measures the single color measurement luminance at each of the determined times (S120).

When the method of FIG. 1 determines the times for measuring the single color measurement luminance (S120), various conditions (e.g., type of the display panel, material of the display panel, manufacturing condition of the display panel, purpose for use of the display panel, etc) are considered. For example, the rate of deterioration for an OLED display panel may be different from that of a liquid crystal display (LCD) panel or a plasma display panel (PDP). The rate of deterioration for different types of OLED display panels may also be different from each other, according to, for example, the organic material included in the display panel or the manufacturing conditions of the display panel. Further, the rate of deterioration of OLED display panels serving as the display of a mobile device may be different from that of TV, according to the purpose for their use. However, these are just some examples, and the type of the display panel, the material of the display panel, the manufacturing condition of the display panel, or the purpose for use of the display panel is not limited thereto.

Depending on the embodiment, the number of single color components of the display panel used to display the single color may be one, but the number of single color components of the display panel used to display various colors in a visible radiation range may be at least three. In example embodiments, the single color components of the display panel are three primary colors such as red, green and blue. For example, when the single color components of a display include red, green and blue components, the display panel includes red, green and blue OLEDs.

In example embodiments, the single color measurement luminance is calculated based on the luminance of a measured white color and the color coordinates of the measured white color. The measured white color is measured at each of the predetermined times and is displayed on the display panel. Color coordinates are defined as the coordinates of a color in a color space mathematically defined for illustrating the various colors. Each color displayed on the display panel has a corresponding color coordinates in the color space. In example embodiments, each color displayed on the display panel has corresponding color coordinates in a CIE 1931 color space. For example, each color displayed on the display panel may have x-coordinate defined as x=X/(X+Y+Z), assuming each stimulus value as X, Y, and Z respectively. Each color displayed on the display panel may have y-coordinate defined as y=Y/(X+Y+Z), assuming each stimulus value as X, Y, and Z respectively.

Since if luminance of a specific color and color coordinates of the specific color are given, each luminance of single color component composing a specific color can be calculated, each luminance of a single color component composing the measured white color (i.e., the single color measurement luminance) can be calculated based on luminance of the measured white color and color coordinates of the measured white color. For example, if the luminance of the measured white color is about 325.5 nit, the x-coordinate of the measured white color is about 0.3036, and the y-coordinate of the measured white color is about 0.3258, measured red luminance of red component composing the measured white color is calculated as about 81.9876 nit, measured green luminance of green component composing the measured white color is calculated as about 222.3863 nit, and measured blue luminance of blue component composing the measured white color is calculated as about 21.12396 nit.

When the method of FIG. 1 calculates the luminance difference between the single color measurement luminance and the single color target luminance (S140) defined as the target luminance of the single color component at each of the predetermined times, the single color target luminance is determined as a target value of luminance of each single color component at the each predetermined time. In example embodiments, the single color target luminance is determined as the luminance of each single color component when the display panel is not deteriorated. For example, the target blue luminance may be determined as the luminance of the blue component when the blue OLED is not deteriorated.

In example embodiments, the luminance of the target white color, as a target of the correction at each of the predetermined times is determined. In an example embodiment, the luminance of the target white color is determined as an initial luminance of the display panel when the display panel is not deteriorated. In another example embodiment, the luminance of the target white color is determined as the luminance which is about the same as the luminance of the measured white color. For example, if the luminance of the measured white color is changed from an initial luminance of about 350 nit to a measured luminance of about 325.5 nit during about 420 hours, the luminance of the measured white color after about 420 hours is determined as the initial luminance of about 350 nit, or the measured luminance of about 325.5 nit.

In example embodiments, the color coordinates of the target white color are determined as the target of the correction at the each predetermined time. In an example embodiment, the color coordinates of the target white color are determined as color coordinates of (0.2958, 0.3185), as the color coordinates of a general white color. In another example embodiment, the color coordinates of the target white color are determined as color coordinates that is required for the display panel to display the white color on the display panel at each of the predetermined times. For example, some OLEDs in the OLED display panel may be relatively more or less deteriorated than other OLEDs, so that the color coordinates of the target white color is determined from the color coordinates of the general white color (0.2958, 0.3185) to color coordinates (i.e., x>0.2958, y>0.3185) to be shifted to yellow (i.e., under-correction) or the color coordinates of the target white color may be determined from the color coordinates of the general white color (0.2958, 0.3185) to color coordinates (i.e., x<0.2958, y<0.3185) to be shifted to violet (i.e., over-correction).

In example embodiments, the color coordinates of the target white color are determined by a user at each of the predetermined times. A method for determining the color coordinates of the target white color will be described detail with referring to FIG. 4.

In example embodiments, the method of FIG. 1 calculates a single color luminance difference (S140) based on the luminance of the target white color and the color coordinates of the target white color. As described above, if the luminance of a specific color and the color coordinates of the specific color are given, each luminance of the single color component composing the specific color can be calculated and the single color measurement luminance can be calculated based on the luminance of the target white color and the color coordinates of the target white color. For example, if the luminance of the target white color is about 325.5 nit, the x-coordinate of the color coordinate of the target white color is about 0.2958, and the y-coordinate of the color coordinate of the target white color is about 0.3185, the target red luminance of the red component composing the target white color is calculated as about 79.25568 nit, the target green luminance of the green component composing the target white color is calculated as about 223.7012 nit, and the target blue luminance of the blue component composing the target white color is calculated as about 22.54312 nit. Accordingly, since it is intuitive that target luminance of each single color component is indirectly determined by determining the target white color and that the target luminance of each single color component is directly determined, it is easier to determine the luminance of the target white color and the color coordinates of the target white color than to determine the target of the correction for deterioration.

When the method of FIG. 1 changes the gamma setting for a data signal provided to the display panel based on the luminance difference (S160), a correlation between displayed luminance and a gray-level data (i.e., the gamma setting) is changed (S160) so that the luminance related to a single color component which has greater deterioration than the other single color components increases. In example embodiment, the average voltage level of the data signal related to a single color component which has a relatively greater deterioration is greater than an average voltage level of the data signal related to a single color component which has a relatively lower deterioration when the gamma setting is changed. For example, when luminance for the blue component is decreased by the deterioration of the blue pixel, the gamma setting is changed so that the luminance of the blue component increases. In other words, the luminance for the blue component is increased by increasing the voltage level of a data signal for the blue component provided to the blue pixel at substantially the same luminance data. Accordingly, the adverse effects induced by the pixel deterioration are minimized.

In example embodiments, the gamma setting are changed based on an offset value read from a look up table (LUT)

based on the luminance difference of the single color. The luminance difference of specific single colors has a corresponding offset value. The gamma setting for the single color component is changed by applying the corresponding offset value to the display panel.

In example embodiments, the offset value is read from the look up table based on a single color luminance ratio defined as a ratio of the luminance difference of the single color to the single color measurement luminance. In example embodiments, each code value corresponding to each gray level of the single color component is changed by the offset value. Since each code value corresponds to the voltage level of the data signal provided to each of the pixels, the gamma setting is changed based on the offset value. For example, when the measured red luminance of the red component is about 81.98976 nit and the luminance difference of the single color is about −2.73407 nit, the single color luminance ratio is calculated as about −2.73407/81.98976=about −0.03335. The offset value is determined from the look up table as about 3 corresponding to the single color luminance ratio. Each code value corresponding to each gray level of red component is then changed by about 3, according to applying the offset value of about 3 to display panel. Accordingly, the voltage level of the data signal applied to pixels according to the luminance (i.e., the displayed luminance) is changed.

In example embodiments, the single color measurement luminance is measured by a simulation experiment. The offset value is read from the look up table based on the deterioration quantity of the display panel measured by the simulation experiment. The gamma settings are changed by the offset value. In example embodiments, the offset value read from the look up table based on the luminance difference of the single color is stored to the memory. Further, the offset value read from the look up table based on the simulation experiment is stored to the memory. Since the offset value is read from the look up table, a step of measurement and a step of calculating the luminance difference of the single color can be skipped. In other words, since the single color measurement luminance can be pre-measured by the simulation experiment, the gamma correction can be performed without a measurement unit for measuring a color displayed on the display.

When the method of FIG. 1 changes the gamma setting based on the luminance characteristic of the display (S180), a second gamma correction considering an eigen-luminance characteristic of the display panel may be needed, after a first gamma correction to minimize the adverse effect by the deterioration of the display panel. In some embodiments, during a manufacturing process, an initial inspection for each display panel is performed, and each gamma setting of each display panel is compared to each other in the initial inspection. For example, the first gamma setting (i.e., central gamma setting) can be changed to minimize the adverse effects due to the deterioration of the display panel and the second gamma setting can be changed based on a cell gamma determined based on the eigen-luminance characteristic of the display panel.

Figure 2A:
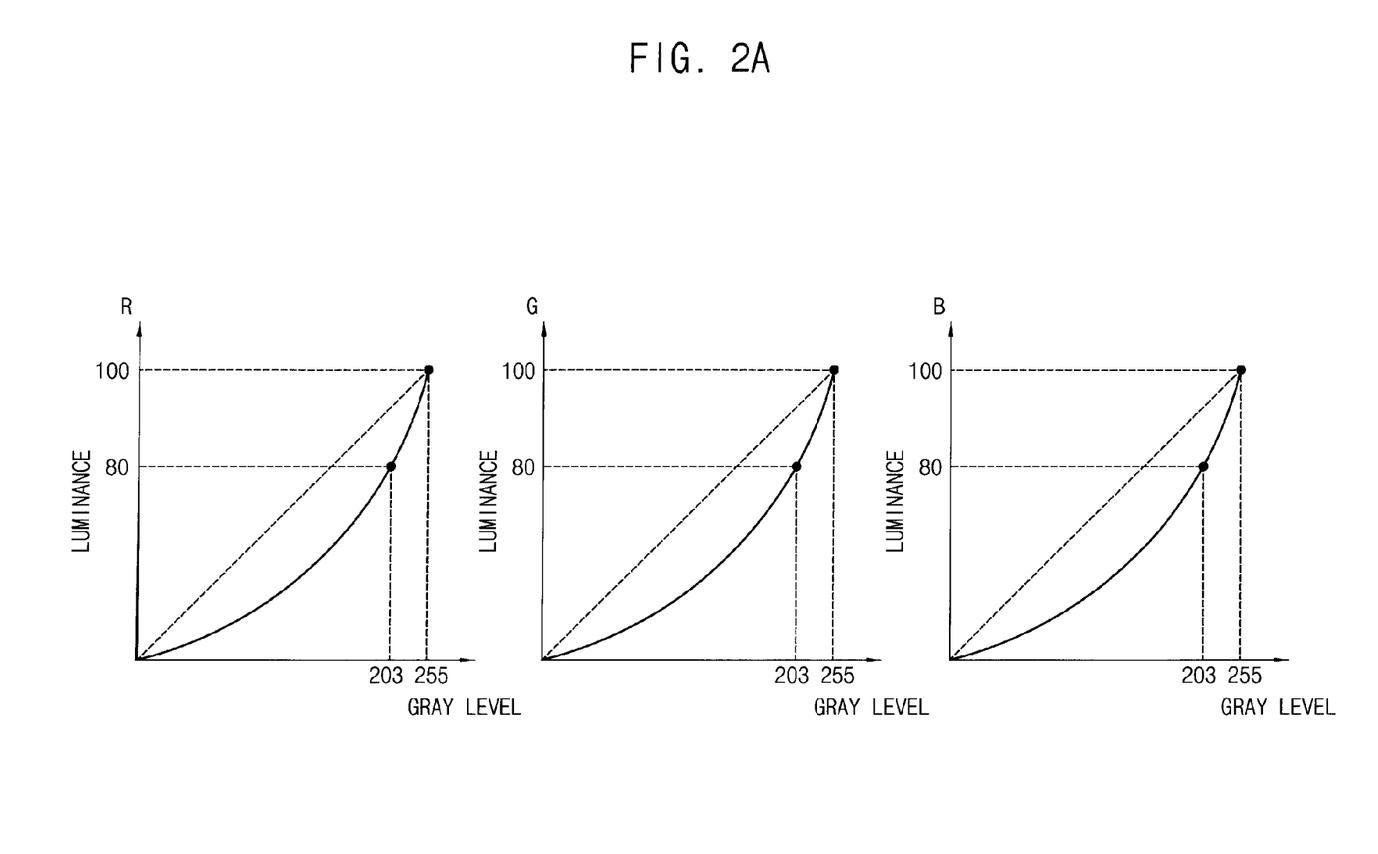
FIG. 2A is a diagram illustrating a gamma setting related to each single color component of a display panel before gamma correction is performed by the method of FIG. 1.
Figure 2B:
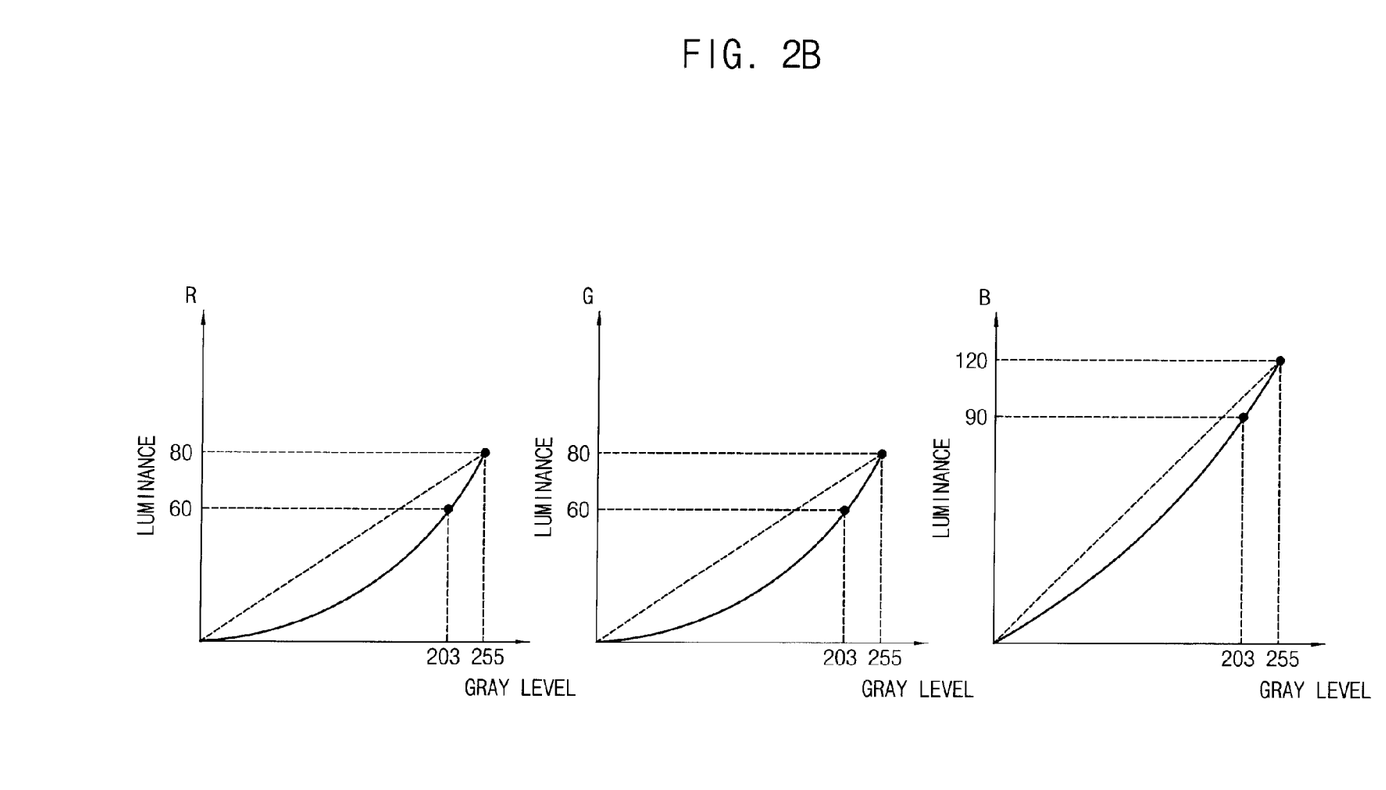
FIG. 2B is a diagram illustrating a gamma setting related to each single color component of a display panel after a gamma correction is performed by the method of FIG. 1.

FIG. 2A is a diagram illustrating a gamma setting related to each single color component of a display panel before gamma correction is performed by the method of FIG. 1. FIG. 2B is a diagram illustrating a gamma setting related to each single color component of a display panel after gamma correction is performed by the method of FIG. 1.

Referring to FIG. 2A, the gamma setting for the single color components displayed on the display panel before the gamma correction are illustrated. A gamma setting for the red color, a gamma setting for the green color and a gamma setting for the blue color are determined such that the data signal having a voltage level corresponding to luminance of 100 nit is provided to pixels having a gray level of 255. Further the gamma setting for the red color, the gamma setting for the green color and the gamma setting for the blue color are determined such that the data signal having a voltage level corresponding to luminance of 80 nit is provided to pixels having a gray level of 203. In example embodiments, a determined data signal is not provided to all pixels having all gray level but is provided to specific pixels having a specific gray level. The other pixels having other gray levels than the specific gray level receive a data signal determined by interpolation. For example, the determined data signal is provided to the specific pixels having the specific gray level (e.g., 255, 203, 151, 87, 51, 35, 23, 11, etc). The data signal (i.e., corresponding to full line in FIG. 2A) determined by the interpolation is provided to the other pixels having the other gray level. (e.g., a middle gray level between the specific gray levels).

Referring to FIG. 2B, the gamma setting for the single color components displayed on the display panel after the gamma correction are illustrated. The gamma settings for the red and green are determined such that the data signal having a voltage level corresponding to luminance of 80 nit is provided to pixels having a gray level of 255. Further the gamma setting for the red and green are determined such that the data signal having a voltage level corresponding to luminance of 60 nit is provided to pixels having a gray level of 203. However, the gamma setting for the blue color is determined such that the data signal having a voltage level corresponding to luminance of 120 nit is provided to pixels having a gray level of 255. Further, the gamma setting for the blue color is determined such that the data signal having a voltage level corresponding to luminance of 90 nit is provided to pixels having a gray level of 203. In example embodiments, the determined data signal is provided to the specific pixels having the specific gray levels. A data signal determined by interpolation may be provided to the other pixels having other gray levels, by the same method as in FIG. 2A.

As described above, by changing the gamma settings using the method of FIG. 1, the average voltage level of the data signal for the blue color component that is deteriorated to a greater level than the other color components is greater than that for the other color components (e.g., red color and green color) that are deteriorated to a relatively lower extent. Accordingly, the adverse effects due to the differing deteriorations of the colors of the display panel are minimized.

Figure 3:
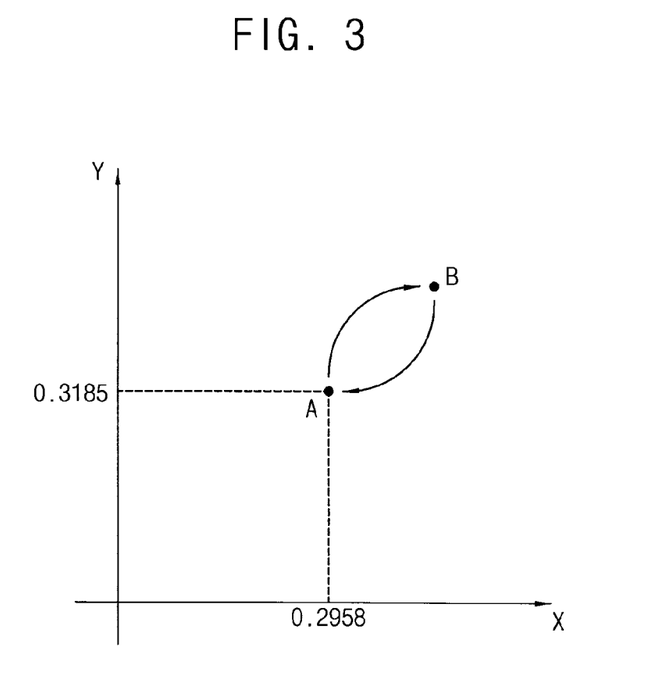
FIG. 3 is a diagram illustrating color coordinates of a white color displayed on a display panel before gamma correction is performed by the method of FIG. 1 and color coordinates of a white color displayed on a display panel after gamma correction is performed by the method of FIG. 1.

FIG. 3 is a diagram illustrating color coordinates of a white color displayed on a display panel before a gamma correction is performed by the method of FIG. 1 and color coordinates of a white color displayed on a display panel after a gamma correction is performed by the method of FIG. 1.

Referring to FIG. 3, color coordinates B is illustrated for the white color displayed on the display panel before the gamma correction, on CIE color space, and additional color coordinates A is illustrated for the white color after the gamma correction. Generally, the color coordinates of the white color has an x-coordinate of about 0.2958 and a y-coordinate of about 0.3185. In other words, the color coordinates of a general white color displayed on an initial display panel may be represented as A in FIG. 3. In example embodiments, since the blue OLED is deteriorated to a relatively greater extent than the OLEDs (e.g., the red and green OLEDs), in the OLED display panel, the color coordinates of the white color displayed on the OLED display panel for a long time may have an x-coordinate greater than about 0.2958 and a y-coordinate greater than about 0.3185. In other words, the color coordinates of the white color may be shifted from the initial white color to the upper right.

However, the method of FIG. 1 changes the gamma settings such that the average voltage level of the data signal related to the single color component that is deteriorated to a greater extent is greater than that of the other color components that are deteriorated to a lesser extent. For example, the average voltage level of the data signal provided to the blue OLED is greater than the average voltage level of the data signal provided to the red and green OLEDs that are deteriorated to a relatively lesser extent. Accordingly, since the voltage level of the data signal is increased according to the amount of deterioration of the blue OLED, the color coordinates of the white color displayed on the display panel can be corrected to color coordinate of A of the general white color. Therefore, the adverse effects generated due to the deterioration of the display panel can be minimized.

Figure 4:
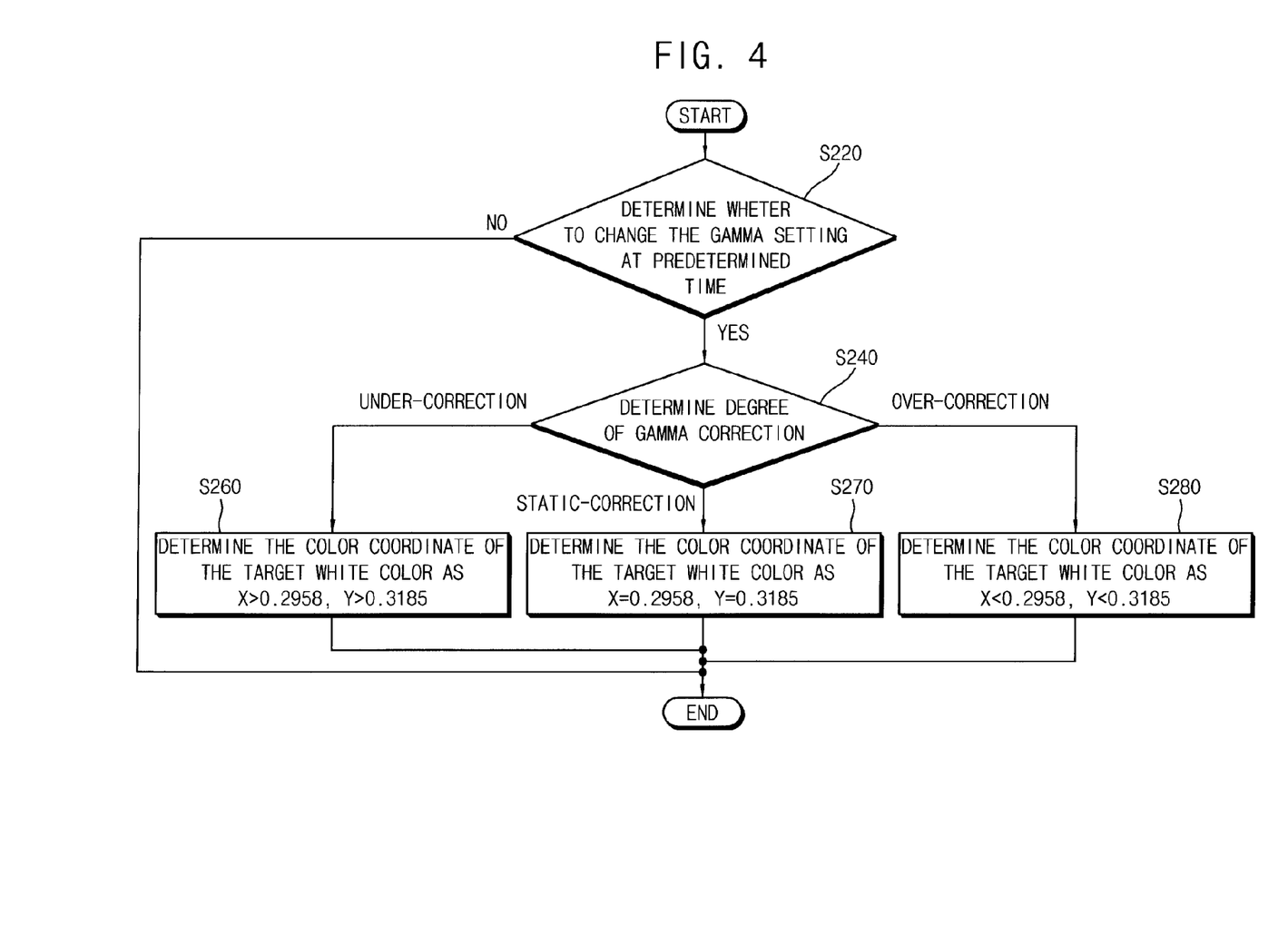
FIG. 4 is a flow chart illustrating an example embodiment in which color coordinates of a target white color is determined by the method of FIG. 1.
Figure 5:
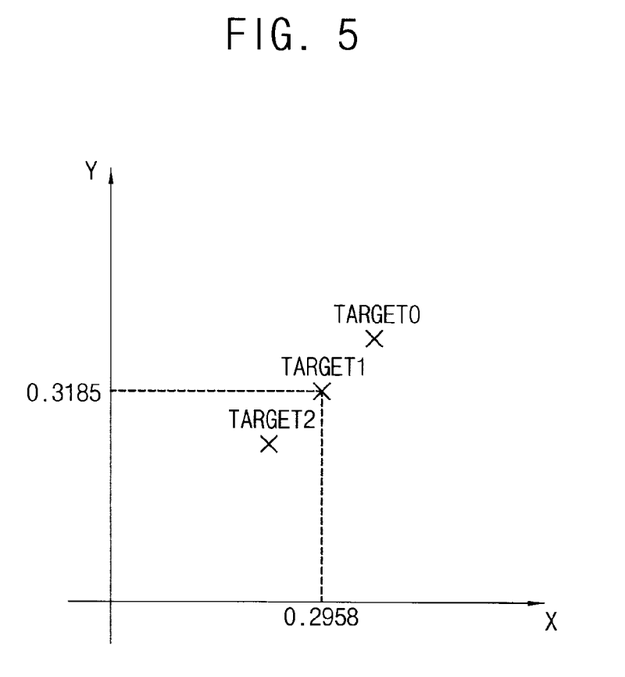
FIG. 5 is a diagram illustrating an example of color coordinates of a target white color that is determined in FIG. 4.

FIG. 4 is a flow chart illustrating an example embodiment in which color coordinates of a target white color are determined by the method of FIG. 1. FIG. 5 is a diagram illustrating an example of color coordinates of a target white color that are determined in FIG. 4.

Referring to FIGS. 4 and 5, the method of FIG. 1 determines whether to change the gamma settings at a plurality of predetermined times (S220) and determines the degree of the gamma corrections (S240). If the degree of the gamma correction is determined as an under-correction, the x-coordinate of the target white color is determined as a value greater than about 0.2958 and the y-coordinate of the target white color is determined as a value greater than about 0.3185 (S260). If the degree of the gamma correction is determined as a static-correction, the x-coordinate of the target white color is determined as a value substantially the same as about 0.2958 and the y-coordinate of the target white color is determined as a value substantially the same as about 0.3185 (S270). Further, if the degree of the gamma correction is determined as an over-correction, the x-coordinate of the target white color is determined as a value less than about 0.2958 and the y-coordinate of the target white color is determined as a value less than about 0.3185 (S280).

If the degree of the gamma correction is determined as under-correction, the x-coordinate of the target white color has a value greater than about 0.2598 and the y-coordinate of the target white color has a value greater than about 0.1385, so that the target white color is located at upper right (TARGET 0) from the general white color in the color space. In example embodiments, the under-correction is performed when the amount of deterioration of the display panel is less than that of the simulation experiment.

If the degree of the gamma correction is determined as the static-correction, the x-coordinate of the target white color has a value substantially the same as about 0.2598 and the y-coordinate of the target white color has a value substantially the same as about 0.1385, so that the target white color is located at substantially the same position (TARGET 1) as the general white color in the color space. In example embodiments, the static-correction is performed when the amount of deterioration of the display panel is substantially the same as that of the simulation experiment.

If the degree of the gamma correction is determined as the over-correction, the x-coordinate of the target white color has a value less than about 0.2598 and the y-coordinate of the target white color has a value less than about 0.1385, so that the target white color is located at lower left (TARGET 2) from the general white color, in the color space. In example embodiments, the over-correction is performed when the amount of deterioration of the display panel is greater than that of the simulation experiment.

Although some examples of the color coordinates of the target white color selected by user are described above, the color coordinates of the target white color selected by the user are not limited thereto.

Figure 6:
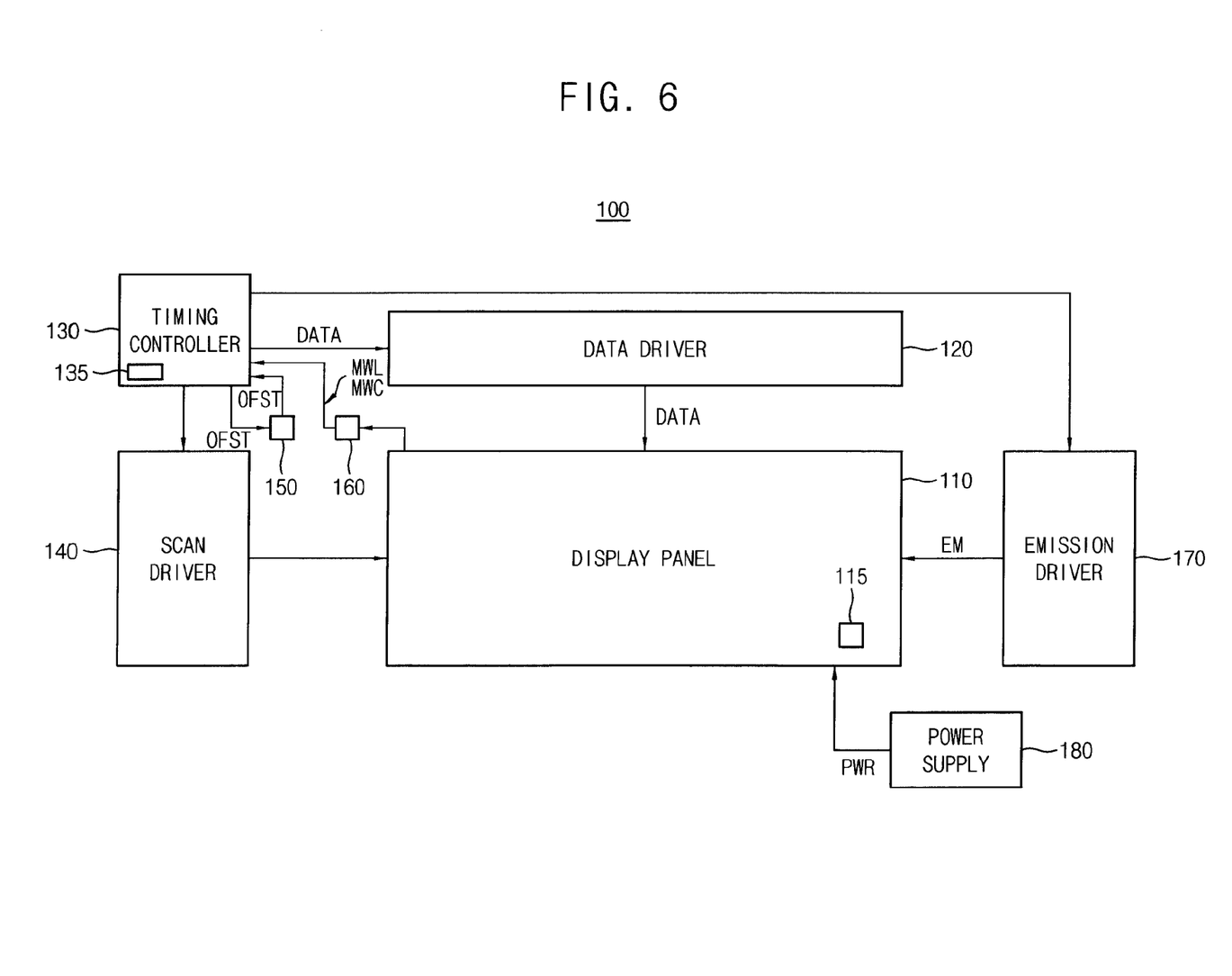
FIG. 6 is a block diagram illustrating a display device according to example embodiments.

FIG. 6 is a block diagram illustrating a display device according to example embodiments.

Referring to FIG. 6, the display device 100 includes a display panel 110, a data driver 120, a timing controller 130 and a scan driver 140. In example embodiments, the display device 100 further includes a memory 150, a measurement unit 160, an emission driver 170 and a power supply 180.

The scan driver 140 provides the display panel 110 with a scan signal SCAN. The emission driver 170 provides the display panel 110 with an emission signal EM controlling the emission of the pixels 115. The power supply 180 provides the display panel 110 with an electrical power PWR.

The display panel 110 includes a plurality of pixels 115. The data driver 120 provides the pixels 115 with a data signal DATA.

The timing controller 130 controls the data driver 120 and calculates the luminance difference between single a color measurement luminance and a single color target luminance. The single color measurement luminance is measured periodically at the a plurality of predetermined times. The single color target luminance is defined as a target luminance of the single color component at each of the predetermined times. The timing controller changes the gamma setting for the data signal based on the luminance difference.

In example embodiments, the single color measurement luminance is measured by a simulation experiment. In example embodiments, the memory 150 stores an offset value OFST read from a look up table based on a luminance difference of a single color. The timing controller 130 changes the gamma setting based on the offset value OFST. In example embodiments, the measurement unit 160 measures the luminance of a measured white color MWL displayed on the display panel 110 at the each predetermined times and the measurement unit 160 further measures the color coordinates of the measured white color MWC.

After measuring the single color measurement luminances related to the single color components displayed on display panel 110 at each of the predetermined times, the timing controller 130 calculates the luminance difference between the respective single color measurement luminances and the single color target luminances. The timing controller 130 changes the gamma setting for the data signal DATA provided to the display panel 110 based on the luminance differences. In example embodiments, the timing controller 130 changes the gamma setting based on the luminance characteristics of the display panel 110.

When the single color measurement luminance related to the single color component displayed on the display panel 110 is measured, the predetermined times for measuring the amount of deterioration of the display panel 110 can be determined. The single color measurement luminance is measured periodically at each of the predetermined times.

When the predetermined times for measuring the single color measurement luminance are determined, various conditions (e.g., type of the display panel 110, material of the display panel 110, manufacturing conditions of the display panel 110, purpose for use of the display panel 110, etc) are considered. For example, the amount of deterioration of an OLED display panel may be different from that of a liquid crystal display panel or a plasma display panel, according to the type of the display panel 110. The amount of deterioration of the OLED display panels may be different each other according to the organic material included in the display panel 110 or the manufacturing conditions of the display panel 110. Further, the amount of deterioration of the OLED display serving as a mobile device may be different from that of TV, according to their purposes for use. Although some examples (e.g., type of the display panel 110, material of the display panel 110, manufacturing condition of the display panel 110, purpose for use of the display panel 110, etc) are described, the type of the display panel 110, the material of the display panel 110, the manufacturing conditions of the display panel 110, or the purpose for use of the display panel 110 are not limited thereto.

The number of single color components of the display panel 110 to display the single color may be one but the number of single color components of the display panel to display various colors in a visible range may be at least three. In example embodiments, the single color components of the display panel are three primary colors consisting of red, green and blue.

In example embodiments, the single color measurement luminances are calculated based on the luminance of the measured white color MWL and the color coordinates of the measured white color MWC. The measured white color is measured at each of the predetermined times and the measured white color is displayed on display panel 110. The color coordinates are defined as coordinates for a color in a color space mathematically defined for illustrating the various colors. Each color displayed on the display panel 110 has corresponding color coordinates in the color space. In example embodiments, each color displayed on the display panel 110 has corresponding color coordinates in a CIE 1931 color space.

If the luminance of a specific color and color coordinates of the specific color are given, each luminance of the single color component composing a specific color can be calculated and each luminance of the single color component composing the measured white color (i.e., the single color measurement luminance) can be calculated based on the luminance of the measured white color MWL and the color coordinates of the measured white color MWC.

The single color target luminance can be determined as target luminance of each single color component at each of the predetermined times. In example embodiments, the single color target luminance is determined as the target luminance of each single color component when the display panel 110 has not deteriorated.

In example embodiments, the luminance of the target white color, as a target of the correction at each of the predetermined times, can be determined. In an example embodiment, the luminance of the target white color is determined as initial luminance of the display panel 110 when the display panel 110 has not deteriorated. In another example embodiment, the luminance of the target white color can be determined to be substantially the same as the luminance of the measured white color MWL.

In example embodiments, the color coordinates of the target white color is determined as the target of the correction at the each predetermined time. In an example embodiment, the color coordinates of the target white color is determined as color coordinates of (0.2958, 0.3185), as color coordinates of a general white color. In another example embodiment, the color coordinates of the target white color are determined as color coordinates to be needed for displaying the white color on the display panel 110 at each of the predetermined times.

In example embodiments, the color coordinates of the target white color are determined by a user at each of the predetermined times.

In example embodiments, the single color luminance difference is calculated based on the single color target luminance and the single color measurement luminance. The single color target luminance is calculated based on the luminance of the target white color and the color coordinates of the target white color. As described above, the single color target luminance is calculated based on the luminance of the target white color and the color coordinates of the target white color, by the same method for calculating the single color measurement luminance based on the luminance of the measured white color MWL and the color coordinates of the measured white color MWC As described above, since it is more intuitive that target luminance of each single color component is indirectly determined by determining the target white color than by directly determining the target luminance of each single color component, the luminance of the target white color and the color coordinates of the target white color can be easily determined, determining the target of the correction for deterioration.

The timing controller 130 can change the correlation between displayed luminance and luminance data (i.e., the gamma setting) such that the luminance related to a single color component which has deteriorated to a greater extent than the other single color components is increased. In example embodiments, an average voltage level of a data signal DATA related to a single color component that is deteriorated to a relatively greater extent is greater than the average voltage level of the data signal DATA related to a single color component that has deteriorated to a lesser extent.

In example embodiments, the gamma setting can be changed based on an offset value OFST read from a look up table based on the luminance difference of the single color. The luminance difference of specific single color has a corresponding offset value OFST. The gamma setting for the single color component can be changed by applying the corresponding offset value OFST to the display panel 110.

In example embodiments, the offset value OFST is read from the look up table based on a single color luminance ratio which is a ratio of the luminance difference to the single color measurement luminance. In example embodiments, each code value corresponding to each gray level of the single color component is changed by the offset value OFST. Since each code value corresponds to the voltage level of the data signal DATA provided to each of the pixels 115, the gamma setting is changed based on the offset value OFST.

In example embodiments, the single color measurement luminance is measured by a simulation experiment. The offset value OFST is read from the look up table based on the amount of deterioration of the display panel 110 measured by the simulation experiment. The gamma setting can be changed by the offset value OFST. In example embodiments, the offset value OFST read from the look up table based on the luminance difference of the single color is stored to the memory. Further, in example, embodiments, the offset value OFST read from the look up table based on the simulation experiment is stored to the memory. Since the timing controller 130 can read the offset value OFST from the look up table, a step of measurement and a step of calculating the luminance difference of the single color can be skipped. In other words, since the single color measurement luminance can be pre-measured by the simulation experiment, the gamma correction can be performed without measurement unit 160 for measuring a color displayed on the display After a first gamma correction to minimize an adverse effect by the deterioration of the display panel 110, a second gamma correction considering an eigen-luminance characteristic of the display panel 110 may be needed. In a manufacturing process, an initial inspection for each display panel 110 can be performed and each gamma setting of each display panel 110 can be compared to the other display panels 110 during the initial inspection.

In example embodiments, the timing controller 130 includes a calculator 135 that calculates the single color measurement luminance based on the luminance of the measured white color MWL and the color coordinates of the measured white color MWC. In example embodiments, the calculator 135 calculates the luminance difference by calculating the single color target luminance based on the luminance of the target white color, as the target of the correction at the each predetermined time, and the color coordinates of the target white color.

The described technology may be applied to an electronic device including a display device (e.g., desktop computer, laptop computer, digital camera, camcorder, mobile phone, smart phone, smart pad, potable multimedia play (PMP), personal digital assistant (PDA), MP3 player, TV, a global positioning system (GPS) for a vehicle, a video phone, an observation system, a tracking system, a movement sensing system, an image stabilizing system, etc).

The foregoing is illustrative of the inventive technology and is not to be construed as limiting thereof. Although a few example embodiments have been described, those skilled in the art will readily appreciate that many modifications are possible in the example embodiments without materially departing from the novel teachings and advantages of the inventive technology. Accordingly, all such modifications are intended to be included within the scope of the invention as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of correcting gamma of a display panel, comprising:
    periodically measuring, at a plurality of predetermined times with display circuitry, a single color measurement luminance related to a single color component that is displayed on the display panel;
    calculating, with the display circuitry, a luminance difference between the single color measurement luminance and a single color target luminance, wherein the single color target luminance is a target luminance of the single color component at each of the predetermined times; and
    changing, with the display circuitry, a gamma setting for a plurality of data signals provided to the display panel based on the luminance difference.

2. The method of claim 1, wherein the display panel is configured to display a plurality of single color components, wherein a first color component of the single color components is deteriorated to a greater extent than the remaining single color components and wherein an average voltage level of the data signal related to the first single color component is greater than average voltage levels of the data signals respectively related to the remaining single color components when the gamma setting is changed.

3. The method of claim 1, further comprising changing, with the display circuitry, the gamma setting based on a luminance characteristic of the display panel.

4. The method of claim 1, wherein the periodically measuring comprises:
    measuring, with the display circuitry, luminance and color coordinates of a white color displayed on the display panel; and
    calculating, with the display circuitry, the single color measurement based on the luminance and color coordinates of the measured white color.

5. The method of claim 4, wherein the periodically measuring further comprises determining, with the display circuitry, luminance and color coordinates of a target white color, wherein the target white color is a correction target at each of the predetermined times and wherein calculating the luminance difference comprises calculating, with the display circuitry, the single color target luminance based on the luminance and color coordinates of the target white color.

6. The method of claim 5, wherein the color coordinates of the target white color are color coordinates that are required for the display panel to display a white color at each of the predetermined times.

7. The method of claim 5, wherein the color coordinates of the target white color are determined by a user at each of the predetermined times.

8. The method of claim 5, wherein the determining of the luminance of the target white color comprises setting the luminance of the target white color to be substantially the same as the luminance of the measured white color.

9. The method of claim 1, further comprising receiving, with the display circuitry, an offset value from a look up table based on the luminance difference, wherein the gamma setting is changed based on the offset value.

10. The method of claim 9, wherein the receiving the offset value is based on a single color luminance ratio and wherein the single color luminance ratio is a ratio of the luminance difference to the single color measurement luminance.

11. The method of claim 1, wherein the single color measurement luminance is measured by a simulation experiment.

12. The method of claim 11, further comprising receiving, with the display circuitry, an offset value from a memory based on the luminance difference and wherein the gamma setting is changed based on the offset value.

13. A display device, comprising:
    a display panel including a plurality of pixels and configured to display a single color component;
    a data driver configured to provide a plurality of data signals to the pixels; and
    a timing controller configured to: i) control the data driver, ii) calculate a luminance difference between the single color measurement luminance related to the single color component and a single color target luminance and iii) change a gamma setting for the data signals based on the luminance difference,
    wherein the timing controller is configured to store the single color measurement luminance, periodically measured at each of a plurality of predetermined times, and wherein the single color target luminance is a target luminance of the single color component at each of the predetermined times.

14. The device of claim 13, wherein the display panel is further configured to display a plurality of single color components, wherein a first color component of the single color components is deteriorated to a greater extent than the remaining single color components and wherein an average voltage level of the data signal related to the first single color component is greater than average voltage levels of the data signals respectively related to the remaining single color components when the gamma setting is changed.

15. The device of claim 13, wherein the timing controller is further configured to change the gamma setting based on a luminance characteristic of the display panel.

16. The device of claim 13, wherein the single color measurement luminance is measured by a simulation experiment.

17. The device of claim 16, further comprising a memory configured to store an offset value that is read from a look up table based on the luminance difference, wherein the timing controller is further configured to change the gamma setting based on the offset value.

18. The device of claim 13, further comprising a measurement unit configured to periodically measure luminance and color coordinates of a white color displayed on the display panel at each of the predetermined times.

19. The device of claim 18, wherein the timing controller includes a calculator configured to calculate the single color measurement luminance based on the luminance and color coordinates of the measured white color.

20. The device of claim 19, wherein the calculator is further configured to calculate the single color target luminance based on luminance and color coordinates of a target white color, wherein the target white color is a target of correction at each of the predetermined times.

* * * * *